Nov. 14, 1967 H. F. WALTER ETAL 3,352,968

ARRANGEMENT FOR STORING INDIVIDUAL TELEVISION PICTURES

Original Filed March 12, 1962

2 Sheets-Sheet 1

Nov. 14, 1967 H. F. WALTER ETAL 3,352,968

ARRANGEMENT FOR STORING INDIVIDUAL TELEVISION PICTURES

Original Filed March 12, 1962 2 Sheets-Sheet 2

United States Patent Office 3,352,968
Patented Nov. 14, 1967

3,352,968
ARRANGEMENT FOR STORING INDIVIDUAL TELEVISION PICTURES

Heinz F. Walter and Hans D. Müller, Karlsruhe, Germany, assignors to Siemens Aktiengesellschaft, Berlin and Munich, Germany, a German corporation Continuation of application Ser. No. 178,998, Mar. 12, 1962. This application June 13, 1966, Ser. No. 557,325
Claims priority, application Germany, Mar. 23, 1961, S 73,111
12 Claims. (Cl. 178—6.6)

This application is a continuation of application Ser. No. 178,998, filed on Mar. 12, 1962, and now abandoned.

The invention disclosed herein is concerned with the storing of individual television pictures, especially X-ray pictures, upon endless tracks of a magnetic record carrier.

The operation of previously known arrangements of this kind has been unsatisfactory until now. For example, the time (> 1 s.) required for the exposure, up to the reproduction of the stored information upon the viewing apparatus, is too long. Another disadvantage of the known arrangement resides in the fact that the individual operations which are required for a recording are not executed fully automatically. The erasing of a recorded information, the switching over of the magnetic heads from reproduction to recording, must be executed individually by hand.

The object of the invention is to produce a central control adapted to deliver with small expenditure accurately defined switching impulses which are correctly phased with respect to the field or vertical synchronizing pulses of the television signal. These switching impulses are directly utilized for the control of television circuits, eraser generators, relays, etc. The time required for the exposure up to the reproduction of the stored information amounts, in the case of an arrangement according to the present invention, for example, to 100 milliseconds.

The invention contemplates the provision of at least one counting chain which is controlled by the field synchronizing pulses, such counting chain being stepped along in timed relation with the field frequency, and means for decoupling from the members of the counting chain isolated impulses which are rigidly in phase with the field sync pulses of the composite television signal. These decoupled impulses are conducted, for example, to bistable multivibrators, and control impulses of corresponding length and phase position are produced which are utilized for the scanning and exposure of the recording tube, as well as for the erasing and for the switching over of the recording and reproducing circuits, etc.

In a preferred embodiment of the invention, the counting chain or chains are respectively provided with at least five and preferably with ten members. It was moreover found to be of particular advantage to record a respective field, wherein two interlaced fields comprise a frame, upon each track of the record carrier. In a preferred embodiment of the invention, there are provided two counting chains, each with ten members, and such chains are circuited so that three modes of operation can be realized, namely, exposure or recording and reproduction of a field, a frame and a 5-picture sequence per second. The switching over of the reproduction channels is in the case of reproducing a frame effected by field sync pulses which are obtained from the reproduced signal. The gating impulses which control the recording- and reproduce channels are, in accordance with a further feature of the invention, so delaved that the switching over at the recording and also at the reproduction is effected at the same time with the back porch of the composite video signal occurring during the retrace portion. This measure avoids a double phase leap of the line impulses.

The foregoing and further objects, features and details of the invention will appear from the description which will be rendered below with reference to the accompanying drawings.

Figure 1:
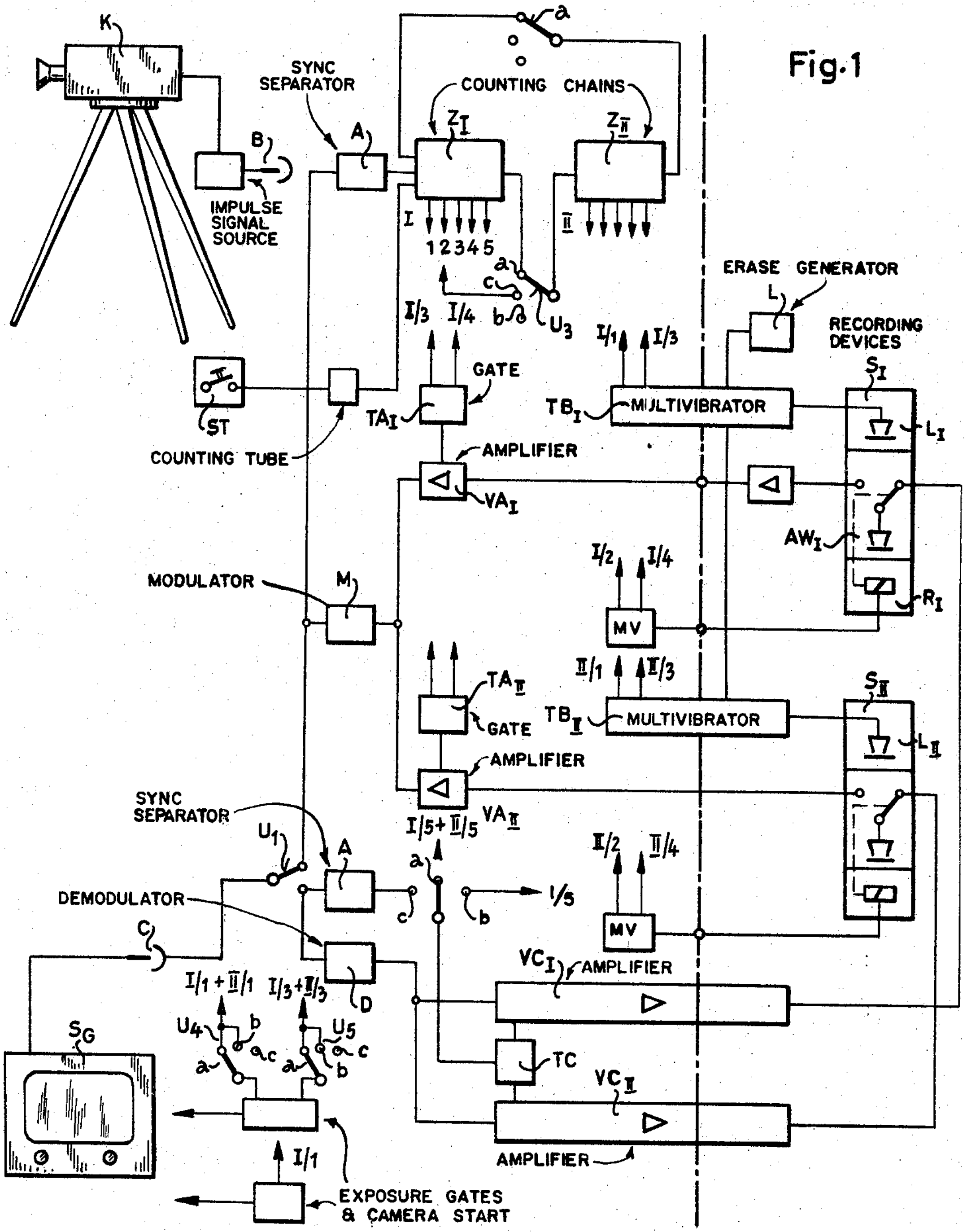
FIG. 1 is a block circuit diagram of the present invention.

In FIG. 1, the letter K indicates a television camera. The signal from the camera K is conducted to the central impulse circuit Z and extended therefrom as a so-called composite television signal to the input B. The field sync pulses from this signal are conducted to the amplitude filter or sync separation $A_I$ and from the latter are conducted to two counting chains $Z_I$ and $Z_{II}$ which are respectively assigned each to a track of the magnetic storer. The two trecording devices of the magnetic storer are indicated at $S_I$ and $S_{II}$. The storer comprises, for example, a plate-shaped rotatable magnetic sound carrier with two concentric recording tracks to each of which is assigned an erase head as indicated at $L_I$ and $L_{II}$ as well as a combined recording- and reproduce head indicated respectively at $AW_I$ and $AW_{II}$. The switching over from recording to reproducing is effected by means of the relays $R_I$ and $R_{II}$.

The counting chains $Z_I$ and $Z_{II}$ comprise, for example, ten members which are stepped along in time with the field frequency. The field sync pulses can be uncoupled and isolated at the first five members indicated by arrows. These field sync pulses are conducted, for example, to bistable multivibrators so as to obtain in this manner positive or negative impulses of defined length and phase position.

The operation of the counting chains $Z_I$ and $Z_{II}$ is started by actuation of the start key ST.

The signal can be extended to the receiver viewer $S_G$ directly, over the switch $U_I$ in its illustrated position, or from the storer over such switch in its alternate operated position. The picture signal is also extended from the input B to the modulator M in which it is in known manner converted into a frequency modulated signal which is conducted over the amplifiers $VA_I$ and $VA_{II}$ to the magnetic heads $AW_I$ and $AW_{II}$. The amplifiers $VA_I$ and $VA_{II}$ are provided with impulse gates $TA_I$ and $TA_{II}$ which are controlled from the third and fourth members of the counting chain $Z_I$ and $Z_{II}$, respectively. There are also provided gate impulse circuits $TB_I$ and $TB_{II}$ which connect the erase generator L with the respective erase heads $L_I$ and $L_{II}$ prior to effecting a new recording.

The signal is for the reproduction scanned by the heads $AW_I$ and $AW_{II}$, respectively, and is conducted to the reproduce amplifiers $VC_I$ and $VC_{II}$. To these amplifiers is likewise assigned a gate circuit TC which is controlled depending upon the mode of operation. The signal obtained from the storers and amplified in the amplifiers $VC_I$ and $VC_{II}$ is demodulated in the demodulator D and is conducted therefrom to the switch $U_I$ and the output terminal C to the viewer $S_G$.

Three different modes of operation may be obtained with the aid of the switches $U_2$, $U_3$, $U_4$ and $U_5$. When these switches are set on the contacts *a* (as shown), five fields will be alternately reproduced per second. One or the other track is thereby respectively scanned and the information stored for the duration of 1/5-second. In the position *b* of the switches $U_2 \ldots U_5$ is effected the reproduction of the individual fields. In the position *c* is effected reproduction of a frame, that is, 25 full pictures per second.

The control is here effected with the aid of the gate circuit TC by field synchronizing impulses which are obtained from the composite television signal which is being scanned by the storer.

Figure 2:
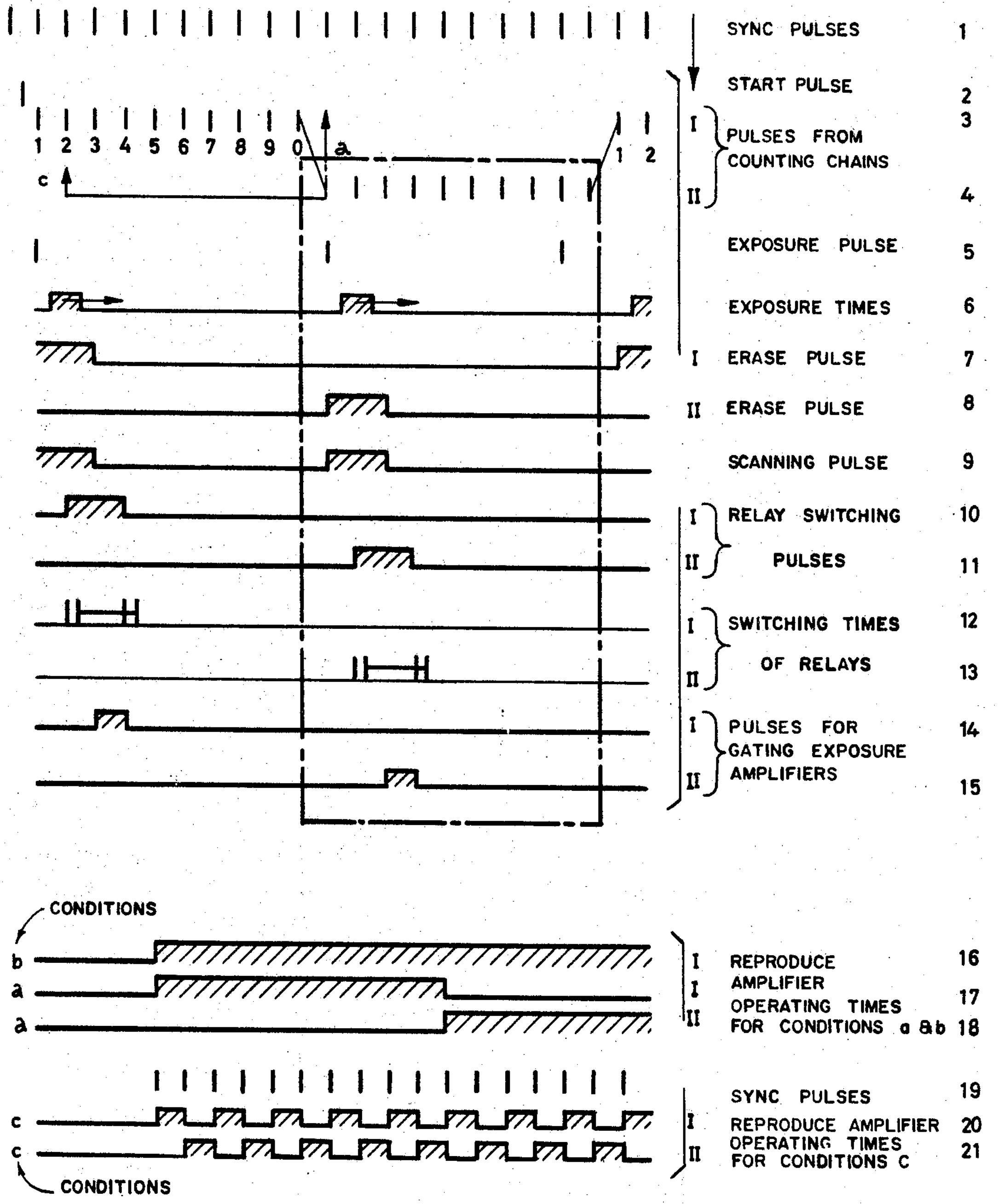
FIG. 2 represents a timing scheme of the signals in the circuit of FIGURE 1.

The operation will be explained with reference to the timing scheme represented in FIG. 2. In line 1 are indicated the field sync pulses (spacing 20 milliseconds) which are obtained from the composite television signal from the amplitude filter A. The impulse released by the actuation of the start key ST, which is not rigidly in phase, fires a counting tube disposed ahead of the chain $Z_I$ and prepares the first stage of the chains, so that the next arriving field sync pulse effects the stepping of the counting chain $Z_I$ and ten field sync pulses are counted off.

As already noted, a counting chain is assigned to each track. Two or more counting chains may be connected together as desired. In the illustrated example, there are provided two tracks with two counting chains $Z_I$, $Z_{II}$, which are circuited so as to obtain three modes of operation, namely, five frames per second, an individual field, and an individual frame. FIG. 2 shows the impulse program for the exposure. The following explanations shall be limited to operations applying to the track I, the operations with respect to the track II and further tracks being identical.

The first impulse of the counting chain $Z_I$ causes release of the start impulse (line 5) for the illumination (exposure) of the television camera, for example, an X-ray exposure. As is apparent from line 6 of the timing scheme, the exposure is effected after a given switching delay. The beam in the camera is at the same time interrupted by the scanning pulse (line 9) and the information is stored on the Vidicon plate. The exposure length can be varied; the scanning-out time of the Vidicon can be adjusted as desired. In the example under consideration, the scanning-out impulse has a duration of 40 milliseconds. During this time is effected the erasure of the previous information on the recording track. The erasure impulse has a duration of 40 milliseconds (line 7) which corresponds to two revolutions of the recording track. The relay switching impulse (line 10) causes the reproduce-exposure-relay to switch to the exposure position.

The switching time is represented in line 12. The gate impulse (line 14) opens the exposure amplifier for exactly 20 milliseconds, and a field is recorded.

The impulse program for the reproduction is represented in lines 16 to 21. In the event that only one field (operating condition *b*) is to be reproduced, the reproduce amplifier will be opened responsive to the 5th impulse (line 16).

In case of the mode of operation *a*, 5 frames per second, the counting chains $Z_I$ and $Z_{II}$ are connected in series, and 20 impulses are always counted off. The last impulse of the second counting chain is thereupon extended to the input of the first counting chain, and the operation is thus periodically repeated. The gate impulses, lines 17 and 18, effect switching over of the reproduce amplifier, with the 5th impulse, in a rhythm of 200 milliseconds.

In case of the frame reproduction, mode of operation *c*, the alternate scanning of the reproduce amplifiers $VC_I$ and $VC_{II}$ is effected by the vertical impulses represented in line 19, which are delivered by the storer.

Changes may be made within the scope and spirit of the appended claims which define what is believed to be new and desired to have protected by Letters Patent.

What we claim is:

1. An arrangement for storing individual television pictures such as X-ray pictures, comprising camera means, means operatively connected to said camera means for converting the camera output signals into spaced field synchronizing impulses, storage means, means operatively conducting said camera output signals to said storage means, at least one counting chain controlled by said field impulses and stepped along in timing with the field impulse frequency, and means for decoupling from the members of said counting chain isolated impulses, which are rigid in phase with respect to the field impulses, said isolated impulses constituting control pulses for the control of operational functions of said arrangement and being connected to said conducting means.

2. An arrangement according to claim 1, comprising an auxiliary counting member disposed ahead of said counting chain, said auxiliary counting member being operatively responsive to a start impulse of desired phase position and being effective to prepare the counting chain for starting the counting operation responsive to the next following field impulse.

3. An arrangement according to claim 2, comprising bistable multivibrator means, controlled by said isolated counting impulses, for producing control impulses the width of which is equal to at least the length of the frame period of the television camera output signal and the flanks of which lie rigidly in time to the field impulses.

4. An arrangement according to claim 2, wherein said camera means includes a pickup tube and the impulses obtained from said counting chain are utilized, first, for the control of the scanning and illumination of the pickup tube, second, for controlling the erasing of information contained in the storer and, third, for switching the magnetic head from recording to reproducing at the proper instant and for the respectively required duration.

5. An arrangement according to claim 4, comprising an exposure amplifier operatively connected to said pickup tube for controlling the exposure thereof, said storage means including a rotatable storer, and an electronic gate circuit for opening the exposure amplifier, with the aid of a control impulse with the length corresponding to a frame period, at the proper instant and for the duration of exactly one revolution of the storer.

6. An arrangement according to claim 5, wherein said counting chain comprises at least five members.

7. An arrangement according to claim 5, comprising two counting chains each having at least five members.

8. An arrangement according to claim 5, for recording two television fields upon two separate magnetic tracks of said storer, comprising for each of such tracks a separate counting chain cooperating with appropriate electronic control devices.

9. An arrangement according to claim 8, wherein the operation of the counting chain of the second track is released by the second impulse of the first counting chain, thereby producing a displacement by one field period and therewith recording of two successive fields of television camera output signal.

10. An arrangement according to claim 8, wherein the input of one counting chain is connected with the output of the other counting chain, thereby effecting a cyclic course of the operations assigned to each track, the period of said cyclic operations being determined by the number of members of said counting chains.

11. An arrangement according to claim 8, for the reproduction of a full frame, wherein the field impulses obtained from the reproduced television signal are connected to and utilized for the alternate opening of the reproduction amplifier cooperating with the respective tracks, thereby producing a composite television signal containing both fields.

12. An arrangement according to claim 11, including means for delaying the pulses for gating the recording and reproducing amplifiers so that the switching over is effected upon the trailing back porch of the television camera output signal and that the switching times for the recording and the reproduction coincide.

No references cited.

JOHN W. CALDWELL, *Primary Examiner.*

DAVID G. REDINBAUGH, *Examiner.*

H. W. BRITTON, *Assistant Examiner.*